(12) United States Patent
Putha et al.

(10) Patent No.: US 11,508,065 B2
(45) Date of Patent: Nov. 22, 2022

(54) METHODS AND SYSTEMS FOR DETECTING ACQUISITION ERRORS IN MEDICAL IMAGES

(71) Applicant: Qure.ai Technologies Private Limited, Mumbai (IN)

(72) Inventors: Preetham Putha, Guntur (IN); Manoj Tadepalli, Krishna Gudivada (IN); Bhargava Reddy, Mumbai (IN); Tarun Raj, Vishakapatnam (IN); Ammar Jagirdar, Mumbai (IN); Pooja Rao, Pune (IN); Prashant Warier, Mumbai (IN)

(73) Assignee: Qure.ai Technologies Private Limited, Mumbai (IN)

( * ) Notice: Subject to any disclaimer, the term of this patent is extended or adjusted under 35 U.S.C. 154(b) by 99 days.

(21) Appl. No.: 17/207,598

(22) Filed: Mar. 19, 2021

(65) Prior Publication Data

US 2022/0245795 A1 Aug. 4, 2022

(30) Foreign Application Priority Data

Feb. 4, 2021 (IN) .............................. 202121004906

(51) Int. Cl.
*G06N 3/08* (2006.01)
*G06T 7/00* (2017.01)
(Continued)

(52) U.S. Cl.
CPC .......... *G06T 7/0012* (2013.01); *G06K 9/6256* (2013.01); *G06K 9/6267* (2013.01); *G06K 9/6292* (2013.01); *G06N 3/0427* (2013.01); *G06N 3/0454* (2013.01); *G06N 3/08* (2013.01); *G06T 2207/10116* (2013.01); *G06T 2207/20081* (2013.01); *G06T 2207/20084* (2013.01); *G06T 2207/30168* (2013.01); *G06V 2201/03* (2022.01)

(58) Field of Classification Search
CPC .. G06K 9/6256; G06K 9/6267; G06K 9/6292; G06N 3/0427; G06N 3/0454; G06N 3/08; G06T 2207/10116; G06T 2207/20081; G06T 2207/20084; G06T 2207/30168; G06T 7/0012; G06V 2201/03
See application file for complete search history.

(56) References Cited

U.S. PATENT DOCUMENTS 9,597,041 B2 * 3/2017 Claus ..................... A61B 6/032
9,918,691 B2 * 3/2018 Von Berg .................. G06T 7/12
(Continued)

*Primary Examiner* — Tsung Yin Tsai
(74) *Attorney, Agent, or Firm* — Shumaker, Loop & Kendrick, LLP

(57) ABSTRACT

This disclosure generally pertains to methods and systems for automatically detecting acquisition errors in a medical image using machine learning. Certain embodiments relate to methods for the development of deep learning algorithms that perform machine recognition of specific features and conditions in imaging and other medical data. Another embodiment provides systems for detecting acquisition errors in an X-ray image, the system comprising a non-transitory computer-readable medium storing a preprocessing quality control module that, when executed by at least one electronic processor, is configured to generate associated classifications identifying characteristics of the medical image.

13 Claims, 2 Drawing Sheets

(51) Int. Cl.
*G06K 9/62* (2022.01)
*G06N 3/04* (2006.01)

(56) References Cited

U.S. PATENT DOCUMENTS

| | | |
|---|---|---|
| 10,475,182 B1 | 11/2019 | Chilamkurhy et al. |
| 10,504,227 B1 | 12/2019 | Chilamkurhy et al. |
| 10,733,727 B2 | 8/2020 | Putha et al. |
| 2008/0242968 A1* | 10/2008 | Claus ................. G06V 10/10 600/407 |
| 2017/0224302 A1* | 8/2017 | Von Berg ............... A61B 6/466 |
| 2021/0321968 A1* | 10/2021 | Sun ....................... G06T 7/0002 |

* cited by examiner

METHODS AND SYSTEMS FOR DETECTING ACQUISITION ERRORS IN MEDICAL IMAGES

RELATED APPLICATIONS

This application claims priority benefit of Indian Patent Application No. 202121004906, filed Feb. 4, 2021, which are incorporated entirely by reference herein for all purposes.

TECHNICAL FIELD

This disclosure generally pertains to methods and systems for automatically detecting acquisition errors in a medical image using machine learning. Some embodiments relate to methods for the development of deep learning algorithms that perform machine recognition of specific features and conditions in imaging and other medical data.

BACKGROUND ART

Medical imaging techniques, such as X-ray imaging, are widely used in diagnosis, clinical studies and treatment planning. There is an emerging need for automated approaches to improve the efficiency, accuracy and cost effectiveness of the medical imaging evaluation.

Chest X-ray imaging is among the most common radiology diagnostic tests, with millions of scans performed globally every year. While the test is frequently performed, reading chest X-ray images is among the more complex radiology tasks, and is known to be highly subjective, with inter-reader agreement varying from a kappa value of 0.2 to 0.77, depending on the level of experience of the reader, the abnormality being detected and the clinical setting.

Due to their affordability, chest X-ray imaging is used all over the world, including areas with few or no radiologists. In many parts of the world, the availability of digital chest X-ray machines is growing more rapidly than the availability of clinicians who are trained highly enough to perform this complex task. If automated detection can be applied in low-resource settings as a disease screening tool, the benefits to population health outcomes globally could be significant. One example of such use of chest X-ray imaging is in tuberculosis screening, where chest X-ray imaging, in the hands of expert readers is more sensitive than clinical symptoms for the early detection of tuberculosis.

The standard procedure for taking X-ray images involves the patient standing in front of a photographic plate while X-rays are fired from a point source a short distance away. An optimal X-ray image needs to meet certain criteria for it to be useful in a diagnostic setting. These include but are not limited to: complete inclusion of the required anatomies such as lung fields, costophrenic (CP) angles, lung apices, cardia and diaphragm; optimal exposure which involves delivering a certain dose of X-rays on to the film; proper inspiration that patient needs to inspire air completely so the lungs are expanded to their fullest extent; and proper patient rotation of the patient to be perfectly parallel to the film to avoid overlapping of anatomies or lung fields. In addition to taking the optimal X-ray, the operator also needs to ensure that the requested view is obtained. For example, an X-ray image can be taken in the views of anterior-posterior/posterior-anterior (AP/PA), lateral and supine. In many cases, suboptimal images that include artifacts or any acquisition errors would diminish their value in a diagnostic setting or render the images unreadable. Thus, methods and systems for better controlling the quality of X-ray imaging remain warranted.

SUMMARY OF THE INVENTION

The present disclosure describes the development of automated deep learning systems that are trained to preprocess an X-ray image to identify characteristics and acquisition errors of the image before passing it for further diagnostic abnormality detection. The object of the present invention is to eliminate suboptimal images from being passed to the abnormality detection module.

Certain embodiments described herein provide methods and systems to automatically detect acquisition errors in medical images (for example, chest X-ray images) using machine learning.

In particular, one embodiment provides a system for detecting acquisition errors in an X-ray image. The system includes at least one server configured to receive a new medical image captured via a medical imaging device, the new medical image associated with a patient. The server comprises a non-transitory computer-readable medium storing a preprocessing quality control (QC) module. The preprocessing QC module comprises a plurality of QC classifiers that are built using deep learning models or deep learning models followed by a rule engine. A training set is compiled by selecting the required images either manually or using DICOM data when available. The testing set is compiled in the same fashion. Multiple ResNet based models are trained for each QC classifier using training information and ensembled to generate a final algorithm.

The preprocessing QC module comprise AP/PA, erect/supine, clipped anatomy, under/over exposure, patient rotation, and inadequate inspiration classifiers. Each QC classifier generates an associated classification identifying one characteristic of the image. The AP/PA classifier is configured to detect whether an X-ray image in question is taken in an AP or a PA view. The erect/supine classifier is configured to detect if the patient is erect or laying down (supine) when the X-ray image was taken. The clipped anatomy classifier is configured to detect if all the required anatomies are visible in the view obtained. The required anatomies include cp angles, lung fields and lung apices. The under/over exposure classifier is configured to detect if an X-ray image is over or under exposed which can result in certain anatomies being essentially unreadable, or more prone to be misread. The patient rotation classifier is configured to detect if the patient is standing parallel to the film while the X-ray image was taken, or at an angle. Proper patient position is required to ensure the x-ray is optimal. The inadequate inspiration classifier is configured to detect if the patient has sufficiently inspired air while the X-ray image was taken or not. Inadequate inspiration can result in occlusion of lung fields from the view.

The training information including a plurality of medical images and associated classifications for each of the plurality of medical images is stored in a medical image database. The ensemble of the classifications of the new medical image indicate whether the new medical image is diagnostically acceptable. The diagnostically acceptable images are passed to the abnormal detection module for further analysis.

Another embodiment provides a method for detecting acquisition errors in medical images. The method includes receiving, with at least one server, a medical image captured via a medical imaging device, the medical image associated with a patient. The method also includes determining a plurality of classifications of the medical image using a preprocessing QC module developed with machine learning using training information. The preprocessing QC module comprises a plurality of QC classifiers that generate associated classifications identifying characteristics of the first medical image. The training information includes a plurality of medical images and associated classifications for each of the plurality of medical images, wherein the ensemble of the classifications of the medical image indicates whether the medical image is diagnostically acceptable. The method further includes passing the diagnostically acceptable image to an abnormal detection module.

In particular, an embodiment provides a system for detecting acquisition errors in an X-ray image, the system comprising a non-transitory computer-readable medium storing a preprocessing quality control module that, when executed by at least one electronic processor, is configured to generate associated classifications identifying characteristics of the medical image:
wherein the preprocessing quality control module comprises,
an anterior-posterior/posterior-anterior classifier developed by performing machine learning using a first set of training X-ray images, wherein the first set of training X-ray images are manually labeled with an anterior-posterior (AP) projection view or a posterior-anterior (PA) projection view;
an erect/supine classifier developed by performing machine learning using a second set of training X-ray images, wherein the second set of training X-ray images are manually labeled with erect or supine;
a clipped anatomy classifier developed by performing machine learning using a third set of training X-ray images, wherein a required anatomy is clipped out in each of the third set of training X-ray images using a deep learning based computer vision module;
an under/over exposure classifier developed by performing machine learning using a fourth set of training X-ray images, wherein the fourth set of training X-ray image are manually labeled with under or over exposure;
an patient rotation classifier developed by performing machine learning using a fifth set of training X-ray images, wherein the patient rotation classifier comprises a U-net based segmentation model trained to give heatmaps of clavicles and spinous processes;
an inspiration classifier developed by performing machine learning using a sixth set of training X-ray images, wherein the inspiration classifier comprises two U-net based segmentation models to segment the ribs and to segment the diaphragm respectively; and
an ensemble model configured to combine the anterior-posterior/posterior-anterior classifier, the erect/supine classifier, the clipped anatomy classifier, the under/over exposure classifier, the patient rotation classifier, and the inspiration classifier to generate a final algorithm.

Another embodiment provides a method for detecting acquisition errors in an X-ray image, comprising
receiving the X-ray image captured via a medical imaging device;
determining a plurality of classifications of the X-ray image via a preprocessing quality control module developed with machine learning; and
outputting a prediction on whether the X-ray image is diagnostically acceptable or diagnostically unacceptable;
wherein the preprocessing quality control module comprises,
an anterior-posterior/posterior-anterior classifier developed by performing machine learning using a first set of training X-ray images, wherein the first set of training X-ray images are manually labeled with an anterior-posterior (AP) projection view or a posterior-anterior (PA) projection view;
an erect/supine classifier developed by performing machine learning using a second set of training X-ray images, wherein the second set of training X-ray images are manually labeled with erect or supine;
a clipped anatomy classifier developed by performing machine learning using a third set of training X-ray images, wherein a required anatomy is clipped out in each of the third set of training X-ray images using a deep learning based computer vision module;
an under/over exposure classifier developed by performing machine learning using a fourth set of training X-ray images, wherein the fourth set of training X-ray image are manually labeled with under or over exposure;
an patient rotation classifier developed by performing machine learning using a fifth set of training X-ray images, wherein the patient rotation classifier comprises a U-net based segmentation model trained to give heatmaps of clavicles and spinous processes;
an inspiration classifier developed by performing machine learning using a sixth set of training X-ray images, wherein the inspiration classifier comprises two U-net based segmentation models to segment the ribs and to segment the diaphragm respectively; and
an ensemble model configured to combine the anterior-posterior/posterior-anterior classifier, the erect/supine classifier, the clipped anatomy classifier, the under/over exposure classifier, the patient rotation classifier, and the inspiration classifier to generate a final algorithm.

Other aspects of the embodiments described herein will become apparent by consideration of the detailed description and accompanying drawings.

BRIEF DESCRIPTION OF DRAWINGS

The invention will be described in more detail below on the basis of a drawing, which illustrates exemplary embodiments. In the drawing, in each case schematically.

DETAILED DESCRIPTION

Figure 1:
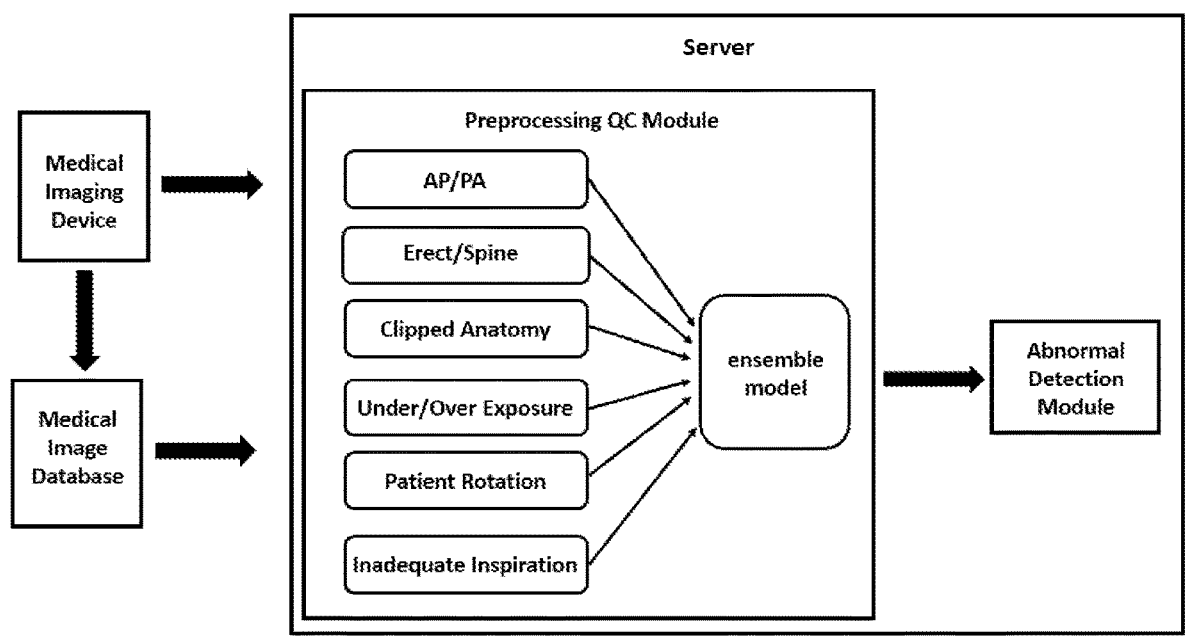
FIG. 1 is a block diagram illustrating an example of a system for detecting acquisition errors in medical images.

It should be understood that this invention is not limited to the particular methodology, protocols, and systems, etc., described herein and as such may vary. The terminology used herein is for the purpose of describing particular embodiments only, and is not intended to limit the scope of the present invention, which is defined solely by the claims.

As used in the specification and appended claims, unless specified to the contrary, the following terms have the meaning indicated below.

"DICOM" refers to digital imaging and communications in medicine, which is the standard for the communication and management of medical imaging information and related data.

"HL7" are a set of international standards used to transfer and share data between various healthcare provides. HL7 was created by Health Level Seven International, a non-profit ANSI-accredited standards development organization dedicated to developing standards for the exchange of electronic health care data.

"Architecture" refers to a set of rules and methods that describe the functionality, organization, and implementation of computer systems.

"Convolutional neural network (CNN)" refers to a class of deep, feed-forward artificial neural networks, most commonly applied to analyzing visual imagery. CNNs use a variation of multilayer perceptrons designed to require minimal preprocessing. A CNN consists of an input and an output layer, as well as multiple hidden layers. The hidden layers of a CNN typically consist of convolutional layers, pooling layers, fully connected layers and normalization layers. Convolutional layers apply a convolution operation to the input, passing the result to the next layer. Local or global pooling layers combine the outputs of neuron clusters at one layer into a single neuron in the next layer. Fully connected layers connect every neuron in one layer to every neuron in another layer. CNNs use relatively little pre-processing compared to other image classification algorithms. This means that the network learns the filters that in traditional algorithms were hand-engineered. This independence from prior knowledge and human effort in feature design is a major advantage.

"Residual neural network (ResNet)" is an artificial neural network (ANN) of a kind that builds on constructs known from pyramidal cells in the cerebral cortex. Residual neural networks do this by utilizing skip connections, or shortcuts to jump over some layers.

"U-Net" is a convolutional neural network that was developed for biomedical image segmentation. The network is based on the fully convolutional network and its architecture was modified and extended to work with fewer training images and to yield more precise segmentations.

One or more embodiments described herein are not limited to the specific details provided herein and may be modified in various ways. Furthermore, other embodiments may exist that are not described herein. Also, the functionality described herein as being performed by one classifier may be performed by multiple classifiers in a distributed manner. Likewise, functionality performed by multiple classifiers may be consolidated and performed by a single classifier. Similarly, a classifier described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used herein, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

The present disclosure illustrates various techniques and configurations that enable the integration and use of machine learning analysis in a data-driven image evaluation workflow. For example, machine learning analysis (such as trained models of image detection of certain medical conditions) may be performed upon medical imaging procedure data produced as part of a medical imaging study. The medical imaging procedure data may include image data captured by an imaging modality, and order data (such as data indicating a request for a radiological image read), each produced to facilitate a medical imaging evaluation (such as a radiology read to be performed by a radiologist or a diagnostic evaluation by another qualified medical professional).

For example, the machine learning analysis may receive and process images from medical imaging procedure data, to identify trained structures, conditions, and conditions within images of a particular study. The machine learning analysis may result in the automated detection, indication, or confirmation of certain characteristics within the images, such as the detection of acquisition errors, urgent or life-critical medical conditions, clinically serious abnormalities, and other key findings. Based on the result of the machine learning analysis, the medical evaluation for the images and the associated imaging procedure may be prioritized, or otherwise changed or modified. Further, the detection of the medical conditions may be used to assist the assignment of the medical imaging data to particular evaluators, the evaluation process for the medical imaging data, or implement other actions prior to, or concurrent with, the medical imaging evaluation (or the generation of a data item such as a report from such medical imaging evaluation).

As further discussed herein, the machine learning analysis may be provided on behalf of any number of machine learning algorithms and trained models, including but not limited to deep learning models (also known as deep machine learning, or hierarchical models) that have been trained to perform image recognition tasks, particularly for certain types of medical conditions upon medical images of human anatomy and anatomical representations. As used herein, the term "machine learning" is used to refer to the various classes of artificial intelligence algorithms and algorithm-driven approaches that are capable of performing machine-driven (e.g., computer-aided) identification of trained structures, with the term "deep learning" referring to a multiple-level operation of such machine learning algorithms using multiple levels of representation and abstraction. However, it will be apparent that the role of the machine learning algorithms that are applied, used, and configured in the presently described medical imaging evaluation may be supplemented or substituted by any number of other algorithm-based approaches, including variations of artificial neural networks, learning-capable algorithms, trainable object classifications, and other artificial intelligence processing techniques.

In some of the following examples, reference is made to radiology medical imaging procedures (e.g., computed tomography (CT), magnetic resonance imaging (MRI), Ultrasound, and X-ray procedures, etc.) and diagnostic evaluation of the images produced from such imaging procedures that would be performed with an image evaluation (e.g., radiology read) by a licensed and credentialed radiologist. It will be understood that the applicability of the presently described techniques and systems will extend to a wide variety of imaging data (and other data representations) produced by various medical procedures and specialties, including those not involving traditional radiology imaging modalities. Such specialties include, but are not limited, to pathology, medical photography, medical data measurements such as electroencephalography (EEG) and electrocardiography (EKG) procedures, cardiology data, neuroscience data, preclinical imaging, and other data collection procedures occurring in connection with telemedicine, telepathology, remote diagnostics, and other applications of medical procedures and medical science. Accordingly, the performance of the data recognition and workflow modification techniques described herein may apply to a variety of medical image data types, settings, and use cases, including captured static images and multi-image (e.g. video) representations.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

FIG. 1 illustrates a system for detecting acquisition errors in an X-ray image according to some embodiments. The system includes at least one server configured to receive a new medical image captured via a medical imaging device, the new medical image associated with a patient.

The server comprises at least one electronic processor. The server may include additional hardware components than those illustrated in FIG. 1 in various configurations. The server may also perform additional functionality other than the functionality described herein. Also, the functionality described herein as being performed by the server may be distributed among multiple devices, such as multiple servers included in a cloud service environment. In addition, in some embodiments, the medical imaging device may be configured to perform all or a portion of the functionality described herein as being performed by the server.

The server receives medical images from a medical imaging device which is a user device configured to capture medical images, such as an X-ray machine. In other embodiments, the server seamlessly integrates with Vendor Neutral Archives (VNA) and PACS without interfering with the existing radiology workflow. Using standard imaging protocols, the server automatically uploads an X-ray image of interest from the client PACS/VNA and responds back with the results overlay and corresponding reports using HL7 formats, allowing the user to have access to analysis prior to review of original X-ray images.

The server comprises a non-transitory computer-readable medium storing a preprocessing quality control (QC) module. The preprocessing QC module comprises a plurality of QC classifiers, when executed by an electronic processor, to detect acquisition errors in medical images. The QC classifiers are classification models that are developed using deep learning neural network models or deep learning neural network models followed by a rule engine. The rule engine is used to glue multiple neural networks to work as a single powerful model seamlessly. Multiple ResNet based models are trained for each QC classifier using training information and ensembled to generate a final algorithm.

The preprocessing QC module comprise AP/PA, erect/supine, clipped anatomy, under/over exposure, patient rotation, and inadequate inspiration classifiers. Each QC classifier generates an associated classification identifying one characteristic of the image. The training information including a plurality of medical images and associated classifications for each of the plurality of medical images is stored in a medical image database.

The AP/PA classifier is developed by performing machine learning using a training set of medical images which is compiled by examining DICOM data from a medical image database and manually separating and labelling the images into two categories, either posterior-anterior (PA) or anterior-posterior (AP) projection view. The trained AP/PA classifier is able to differentiate between these two classes and predict the specific projection view. The classifier is based on a deep neural network (DNN) architecture that takes an image and output a prediction. Accordingly, when a subsequent new medical image is received, the trained AP/PA classifier may predict the project view of the new image. The AP/PA classifier for automatically predicting the projection view of chest radiographs would be very useful because it would reduce the incidence of mislabeled or unlabeled images and save time used to reorient images. Thus, such a classifier would improve the efficiency and effectiveness of automated electronic image management and display.

The erect/supine classifier is developed by performing machine learning using a training set of medical images which is compiled in a similar fashion as the AP/PA algorithm. The DICOM data from a medical image database is examined and manually separated and labelled into two categories, erect or supine. Additionally, images which do not have DICOM metadata are processed using a text extractor to determine if "supine" is stamped on the image, which is the case with most of the supine X-ray images. Images which do not have "supine" written on them or have "erect" in their DICOM metadata are considered "erect". A deep learning classifier is then trained using the above dataset to classify erect and supine images.

The clipped anatomy classifier is developed by performing machine learning using a training set of medical images in which various anatomies of the lung would be dynamically clipped and marked accordingly. To accomplish this, a computer vision module that identifies various anatomies of the lung has been built using deep learning based segmentation models. These segmentation models identify the lung regions, apices, CP angles and diaphragm in a given chest X-ray image. This computer vision module is used to crop out the required anatomy and build the specific dataset to be used in training the clipped anatomy classifier. For example, a computer vision module is used to clip out CP angles from an X-ray image and the "clipped CP angles" ground truth is assigned to this image, a classifier is then trained on this image to detect the CP angle clipping. In this case, the algorithm of the classifier is manually taught the differences between CP angle and non-CP angle. In some embodiments, a computer vision module comprises a U-Net based neural network trained to output anatomical ResNet masks corresponding to specific anatomies. A similar procedure is used to train the classifier for other clipped anatomies.

The under/over exposure classifier is developed by performing machine learning using a training set of human-labeled medical images. Under or over exposed X-ray images are identified by paying close attention to the mediastinum part of the x-rays. In the clinical context, an underexposed chest X-ray will appear "grainy," and display poor penetration of the mediastinal structures leading to an inaccurate representation of anatomy. Under/over exposure data is extracted from the reports and is labeled and used to build the training set. While training, only the mediastinum portion of X-ray images is passed to the model to eliminate noise, which results in a more accurate model.

The patient rotation classifier is a rule-based model applied on top of a segmentation output. U-net based segmentation models are trained to give heatmaps of both clavicles and spinous processes from the given X-ray. The spinous processes need to be equal-distant from the medial ends of both the clavicles. If not, the image is determined to be rotated. The heatmaps are processed to determine the distance of the center-of-mass of spinous processes to each of the clavicles. The two distances are compared, and an assessment of patient rotation is made.

Similar to the patient rotation classifier, the inspiration classifier is a rule-based model on top of segmentation output. The diaphragm is below the eighth rib when the patient has adequately inspired. Two U-net based segmentation models are trained to segment the ribs and to segment the diaphragm, separately. This segmentation output is used to count the number of ribs above the diaphragm and determine the amount of inspiration.

In some embodiments, the outputs of the six classifiers may be ensembled to generate a final algorithm. This task is performed by an ensemble model. The ensemble model may apply common ensemble techniques including but not limited to max voting, averaging, weighted averaging, stacking, blending, bagging, and boosting. The ensemble of the classifications of the new medical image indicate whether the new medical image is diagnostically acceptable. The server may further comprise an abnormal detection module. The diagnostically acceptable images are passed to the abnormal detection module for further analysis. The abnormal detection module is described in U.S. Pat. Nos. 10,733,727 and 10,755,413, the entirety of which is expressly incorporated herein by reference.

Figure 2:
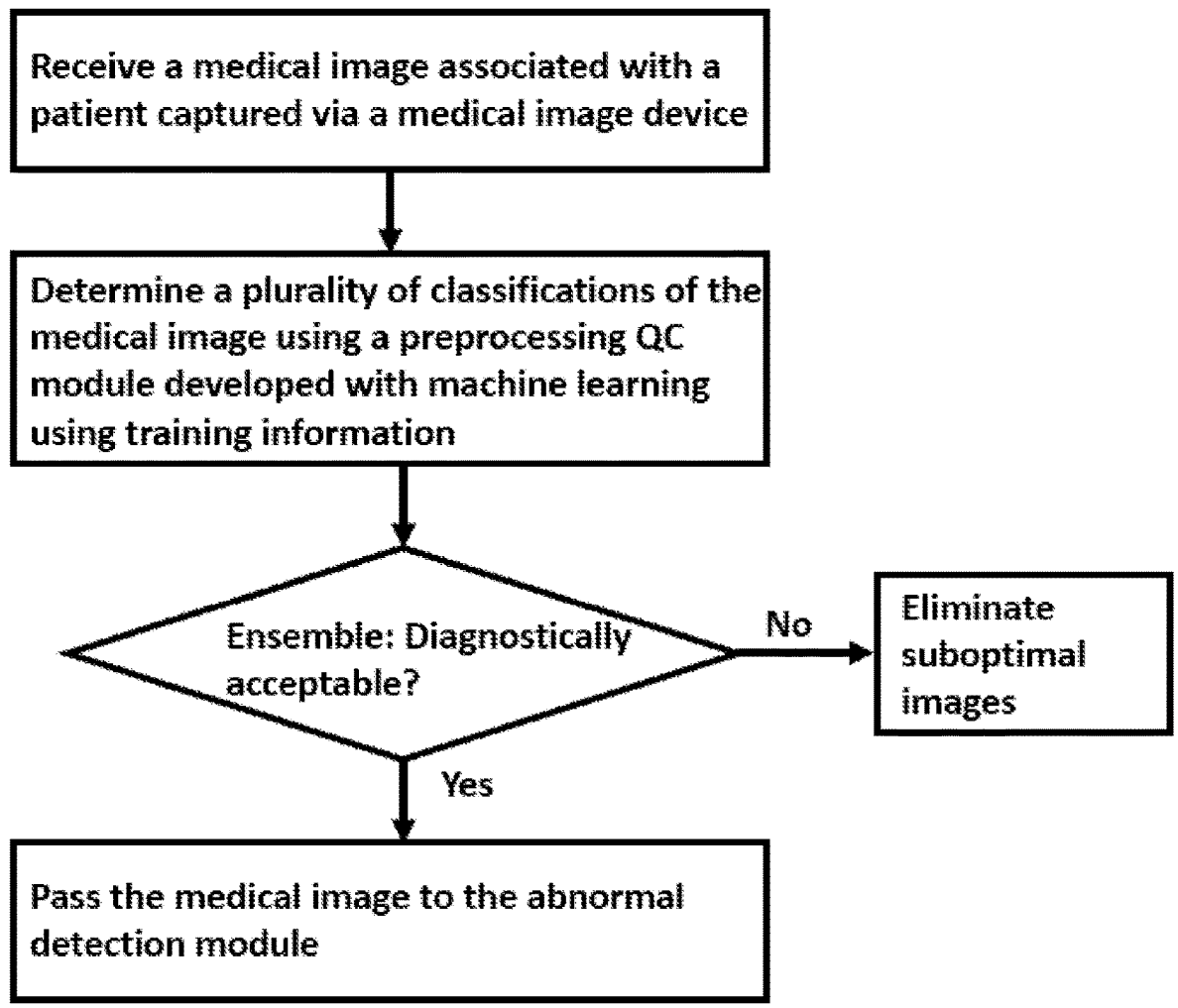
FIG. 2 is a flowchart illustrating a method of detecting acquisition errors in medical images.

FIG. 2 is a flowchart illustrating a method for detecting acquisition error in a medical image according to some embodiments. The method is described here as being performed by the server (via an electronic processor executing instructions). However, as noted, above, portions of the functionality performed by the server (or a portion thereof) may be performed by other devices, including, for example, the medical image device.

As illustrated in FIG. 2, the method includes receiving a medical image captured via the medical imaging device, wherein the medical image is associated with a patient. After receiving the medical image, the server (with at least one electronic processor) determines a plurality of classifications of the medical image using a preprocessing QC module developed with machine learning using training information as described above. The module may include a plurality of the classification models.

In some embodiments, the server determines the classification of the medical image by analyzing content of the medical image with the classifiers to identify the characteristics of the medical image including the projection view (AP or PA), patient position (erect or supine) and rotation, available anatomies in the image, exposure degree of the X-ray image (under or over exposure), and patient inspiration. The ensemble model integrates the outputs of the six classifiers to generate a final outcome. For example, when the medical image does not include an acquisition error, the medical image is classified as diagnostically acceptable. When the medical image is classified as being diagnostically acceptable ("Yes"), the image would be passed to the abnormal detection module for abnormality analysis. However, when the medical image includes one or more acquisition error, the medical image is classified as diagnostically unacceptable. In other embodiments, the medical image is classified as diagnostically unacceptable when a total number of acquisition errors of the medical image exceeds a predetermined threshold. When the medical image is classified as being diagnostically unacceptable ("No"), the suboptimal medical image would be eliminated.

The invention claimed is:

1. A system for detecting acquisition errors in an X-ray image, the system comprising a non-transitory computer-readable medium storing a preprocessing quality control module that, when executed by at least one electronic processor, is configured to generate associated classifications identifying characteristics of the medical image,
wherein the preprocessing quality control module comprises,
an anterior-posterior/posterior-anterior classifier developed by performing machine learning using a first set of training X-ray images, wherein the first set of training X-ray images are manually labeled with an anterior-posterior (AP) projection view or a posterior-anterior (PA) projection view;
an erect/supine classifier developed by performing machine learning using a second set of training X-ray images, wherein the second set of training X-ray images are manually labeled with erect or supine;
a clipped anatomy classifier developed by performing machine learning using a third set of training X-ray images, wherein a required anatomy is clipped out in each of the third set of training X-ray images using a deep learning based computer vision module;
an under/over exposure classifier developed by performing machine learning using a fourth set of training X-ray images, wherein the fourth set of training X-ray image are manually labeled with under or over exposure;
an patient rotation classifier developed by performing machine learning using a fifth set of training X-ray images, wherein the patient rotation classifier comprises a U-net based segmentation model trained to give heatmaps of clavicles and spinous processes;
an inspiration classifier developed by performing machine learning using a sixth set of training X-ray images, wherein the inspiration classifier comprises two U-net based segmentation models to segment the ribs and to segment the diaphragm respectively;

and
    an ensemble model configured to combine the anterior-posterior/posterior-anterior classifier, the erect/supine classifier, the clipped anatomy classifier, the under/over exposure classifier, the patient rotation classifier, and the inspiration classifier to generate a final algorithm.

2. The system of claim 1, wherein the preprocessing quality control module are developed using deep learning neural network models or deep learning neural network models followed by a rule engine.

3. The system of claim 2, wherein the deep learning neural network models are ResNet based models.

4. The system of claim 1, wherein the computer vision module comprises a U-Net based neural network trained to output anatomical ResNet masks corresponding to specific anatomies.

5. The system of claim 1, wherein an ensemble model is configured to output a prediction on whether the X-ray image is diagnostically acceptable or diagnostically unacceptable.

6. The system of claim 5, wherein the diagnostically acceptable image is passed to an abnormal detection module for further analysis.

7. The system of claim 5, wherein the diagnostically unacceptable image is eliminated.

8. A method for detecting acquisition errors in an X-ray image, comprising
    receiving the X-ray image captured via a medical imaging device;
    determining a plurality of classifications of the X-ray image via a preprocessing quality control module developed with machine learning; and
    outputting a prediction on whether the X-ray image is diagnostically acceptable or diagnostically acceptable;
    wherein the preprocessing quality control module comprises,
    an anterior-posterior/posterior-anterior classifier developed by performing machine learning using a first set of training X-ray images, wherein the first set of training X-ray images are manually labeled with an anterior-posterior (AP) projection view or a posterior-anterior (PA) projection view;
    an erect/supine classifier developed by performing machine learning using a second set of training X-ray images, wherein the second set of training X-ray images are manually labeled with erect or supine;
    a clipped anatomy classifier developed by performing machine learning using a third set of training X-ray images, wherein a required anatomy is clipped out in each of the third set of training X-ray images using a deep learning based computer vision module;
    an under/over exposure classifier developed by performing machine learning using a fourth set of training X-ray images, wherein the fourth set of training X-ray image are manually labeled with under or over exposure;
    an patient rotation classifier developed by performing machine learning using a fifth set of training X-ray images, wherein the patient rotation classifier comprises a U-net based segmentation model trained to give heatmaps of clavicles and spinous processes;
    an inspiration classifier developed by performing machine learning using a sixth set of training X-ray images, wherein the inspiration classifier comprises two U-net based segmentation models to segment the ribs and to segment the diaphragm respectively;
    and
    an ensemble model configured to combine the anterior-posterior/posterior-anterior classifier, the erect/supine classifier, the clipped anatomy classifier, the under/over exposure classifier, the patient rotation classifier, and the inspiration classifier to generate a final algorithm.

9. The method of claim 8, wherein the preprocessing quality control module are developed using deep learning neural network models or deep learning neural network models followed by a rule engine.

10. The method of claim 9, wherein the deep learning neural network models are ResNet based models.

11. The method of claim 8, wherein the computer vision module comprises a U-Net based neural network trained to output anatomical ResNet masks corresponding to specific anatomies.

12. The method of claim 8, wherein the diagnostically acceptable image is passed to an abnormal detection module for further analysis.

13. The method of claim 8, wherein the diagnostically unacceptable image is eliminated.

* * * * *